US012563356B2

(12) United States Patent
Mizuno et al.

(10) Patent No.: US 12,563,356 B2
(45) Date of Patent: Feb. 24, 2026

(54) INFORMATION PROCESSING METHOD, RECORDING MEDIUM, AND SOUND REPRODUCTION DEVICE

(71) Applicant: Panasonic Intellectual Property Corporation of America, Torrance, CA (US)

(72) Inventors: Ko Mizuno, Osaka (JP); Seigo Enomoto, Kyoto (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 235 days.

(21) Appl. No.: 18/104,908

(22) Filed: Feb. 2, 2023

(65) Prior Publication Data

US 2023/0179938 A1 Jun. 8, 2023

Related U.S. Application Data

(63) Continuation of application No. PCT/JP2021/026585, filed on Jul. 15, 2021.

(Continued)

(30) Foreign Application Priority Data

May 31, 2021 (JP) ................................ 2021-091020

(51) Int. Cl.
*H04S 7/00* (2006.01)

(52) U.S. Cl.
CPC ..................................... *H04S 7/30* (2013.01)

(58) Field of Classification Search
None
See application file for complete search history.

(56) References Cited

U.S. PATENT DOCUMENTS

| | | | | |
|---|---|---|---|---|
| 10,237,677 | B1 * | 3/2019 | Matsumoto | H04S 7/302 |
| 2004/0091119 | A1 * | 5/2004 | Duraiswami | H04S 1/002 381/26 |

(Continued)

FOREIGN PATENT DOCUMENTS

| | | |
|---|---|---|
| EP | 1 227 392 | 7/2002 |
| JP | H09-046797 | 2/1997 |

(Continued)

OTHER PUBLICATIONS

Extended European Search Report issued Jan. 4, 2024 in corresponding European Patent Application No. 21858078.5.

(Continued)

*Primary Examiner* — Duc Nguyen
*Assistant Examiner* — Assad Mohammed
(74) *Attorney, Agent, or Firm* — Wenderoth, Lind & Ponack, L.L.P.

(57) ABSTRACT

An information processing method includes: calculating an angular amount of change in a predetermined direction in a time domain from sound information including information regarding a predetermined sound and information regarding the predetermined direction; selecting, based on the information regarding the predetermined direction, a 3D sound filter for causing an inputted sound to be perceived as a sound coming from an incoming direction from among 3D sound filter candidates each prepared for a different incoming direction; and generating an output sound signal by inputting the information regarding the predetermined sound to the 3D sound filter selected, in which, when the angular amount of change calculated is less than a threshold, the selecting a 3D sound filter includes determining the 3D sound filter such that the predetermined sound is more strongly emphasized than when the angular amount of change calculated is greater than or equal to the threshold.

8 Claims, 4 Drawing Sheets

Related U.S. Application Data

(60) Provisional application No. 63/068,003, filed on Aug. 20, 2020.

(56) References Cited

U.S. PATENT DOCUMENTS

| | | | | |
|---|---|---|---|---|
| 2010/0246831 | A1 | 9/2010 | Mahabub et al. | |
| 2015/0055783 | A1* | 2/2015 | Luo | H04S 5/00<br>381/17 |
| 2018/0007490 | A1 | 1/2018 | Lehtiniemi et al. | |
| 2019/0174246 | A1 | 6/2019 | De Bruijn et al. | |
| 2019/0215637 | A1* | 7/2019 | Lee | H04R 5/033 |
| 2019/0335288 | A1* | 10/2019 | Latypov | H04S 7/303 |
| 2020/0089466 | A1* | 3/2020 | Eronen | G06F 3/167 |

FOREIGN PATENT DOCUMENTS

| | | |
|---|---|---|
| JP | 2020-18620 | 2/2020 |
| WO | 2019/197403 | 10/2019 |

OTHER PUBLICATIONS

International Search Report issued Oct. 12, 2021 in International (PCT) Application No. PCT/JP2021/026585.

Makoto Otani et al., "Auditory Artifacts due to Switching Head-Related Transfer Functions of a Dynamic Virtual Auditory Display", IEICE Transactions on Fundamentals of Electronics, Communications and Computer Sciences, vol. E91-A, No. 6, Jun. 2008, pp. 1320-1328.

* cited by examiner

INFORMATION PROCESSING METHOD, RECORDING MEDIUM, AND SOUND REPRODUCTION DEVICE

CROSS REFERENCE TO RELATED APPLICATIONS

This is a continuation application of PCT International Application No. PCT/JP2021/026585 filed on Jul. 15, 2021, designating the United States of America, which is based on and claims priority of Japanese Patent Application No. 2021-091020 filed on May 31, 2021 and U.S. Provisional Patent Application No. 63/068,003 filed on Aug. 20, 2020. The entire disclosures of the above-identified applications, including the specifications, drawings and claims are incorporated herein by reference in their entirety.

FIELD

The present disclosure relates to a sound reproduction device, and an information processing method and a recording medium related to the sound reproduction device.

BACKGROUND

Techniques relating to sound reproduction for causing a user to perceive 3D sounds by controlling the positions of sound images which are sensory sound-source objects in a virtual three-dimensional space have been conventionally known (for example, see Patent Literature (PTL) 1).

CITATION LIST

Patent Literature

PTL 1: Japanese Unexamined Patent Application Publication No. 2020-18620

SUMMARY

Technical Problem

Meanwhile, in causing a user to perceive sounds as 3D sounds in a three-dimensional sound field, a sound difficult to be perceived by the user may be produced. In information processing methods of the conventional sound reproduction devices or the like, an appropriate process may not be performed on such a sound difficult to be perceived.

In view of the above, the object of the present disclosure is to provide an information processing method or the like that allows a user to perceive 3D sounds more appropriately.

Solution to Problem

An information processing method according to one aspect of the present disclosure is an information processing method of generating an output sound signal from sound information including information regarding a predetermined sound and information regarding a predetermined direction at each of time points in a time domain. The output sound signal is a signal for causing a user to perceive the predetermined sound in time series as a sound coming from an incoming direction in a three-dimensional sound field corresponding to the predetermined direction. The information processing method includes: calculating an angular amount of change in the predetermined direction in the time domain; selecting, based on the information regarding the predetermined direction, a three-dimensional (3D) sound filter for causing an inputted sound to be perceived as a sound coming from the incoming direction from among 3D sound filter candidates each prepared for a different incoming direction; and generating the output sound signal by inputting the information regarding the predetermined sound to the 3D sound filter selected, in which, when the angular amount of change calculated is less than a threshold, the selecting a 3D sound filter includes determining the 3D sound filter such that the predetermined sound is more strongly emphasized than when the angular amount of change calculated is greater than or equal to the threshold to cause the user to perceive the predetermined sound.

Moreover, a sound reproduction device according to one aspect of the present disclosure is a sound reproduction device that generates and reproduces an output sound signal from sound information including information regarding a predetermined sound and information regarding a predetermined direction at each of time points in a time domain. The output sound signal is a signal for causing a user to perceive the predetermined sound as a sound coming from an incoming direction in a three-dimensional sound field corresponding to the predetermined direction. The sound reproduction device includes: an obtainer that obtains the sound information; a filter selector that calculates an angular amount of change in the predetermined direction in the time domain, and selects, based on the information regarding the predetermined direction, a three-dimensional (3D) sound filter for causing an inputted sound to be perceived as a sound coming from the incoming direction from among 3D sound filter candidates each prepared for a different incoming direction; an output sound generator that generates the output sound signal by inputting, as the inputted sound, the information regarding the predetermined sound to the 3D sound filter selected; and an outputter that outputs a sound according to the output sound signal generated, in which, when the angular amount of change calculated is less than a threshold, the filter selector determines the 3D sound filter such that the predetermined sound is more strongly emphasized than when the angular amount of change calculated is greater than or equal to the threshold to cause the user to perceive the predetermined sound.

Moreover, one aspect of the present disclosure can be implemented as a non-transitory computer-readable recording medium having a program recorded thereon for causing a computer to execute the sound reproduction method described above.

Note that these general or specific aspects may be implemented using a system, a device, a method, an integrated circuit, a computer program, or a non-transitory computer-readable recording medium such as a compact disc read only memory (CD-ROM), or using any combination of systems, devices, methods, integrated circuits, computer programs, and recording media.

Advantageous Effects

The present disclosure allows a user to perceive 3D sounds more appropriately.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
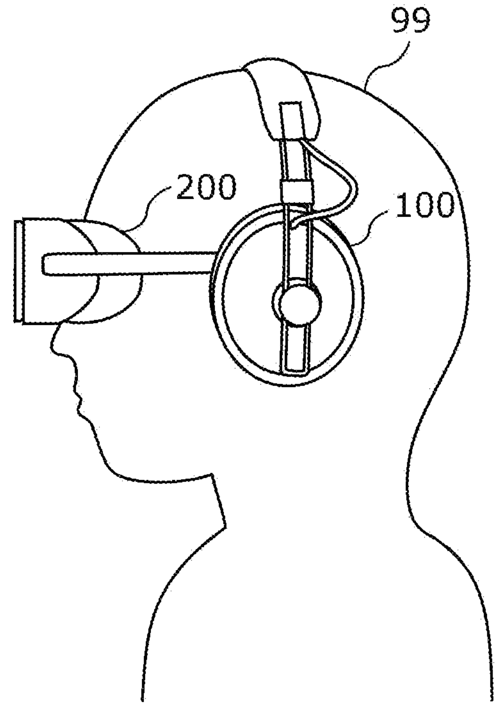
FIG. 1 is a schematic view illustrating an example of use of a sound reproduction device according to an embodiment.

DESCRIPTION OF EMBODIMENT (Underlying Knowledge Forming Basis of the Present Disclosure)

Techniques relating to sound reproduction for causing a user to perceive 3D sounds by controlling the positions of sound images which are user's sensory sound-source objects in a virtual three-dimensional space (hereinafter, also referred to as a three-dimensional sound field) have been conventionally known (for example, see PTL 1). A sound image is localized at a predetermined position in the virtual three-dimensional space. In this manner, a user can perceive a sound as if the sound comes from the direction parallel to a line connecting the predetermined position and the user (i.e., a predetermined direction). In order to localize a sound image at a predetermined position in the virtual three-dimensional space as described above, for example, a calculation process that processes a picked-up sound to produce a difference in sound level (or a difference in sound pressure) between ears, a difference in sound arrival time between ears, and the like, which cause a user to perceive a 3D sound, is needed.

As one example of such a calculation process, it is known that the signal of a target sound is convolved with a head-related transfer function to cause a user to perceive the sound as a sound coming from a predetermined direction. The presence felt by the user is enhanced by more finely performing the convolution process of the head-related transfer function. Meanwhile, in the convolution of the head-related transfer function, it is known that a change in the time domain regarding the incoming direction of a sound is difficult to be perceived. For this reason, the user may misperceive a sound having a little change in the time domain as a sound having no change.

Moreover, in recent years, the development of techniques relating to virtual reality (VR) has been going on vigorously. In the virtual reality, a virtual three-dimensional space is independent from the motion of a user, and the focus of the virtual reality is that the user feels as if he/she were moving in the virtual space. In particular, in the virtual reality technique, the attempt to more enhance the presence by incorporating auditory elements into visual elements has been going on. For example, in the case where a sound image is localized in front of a user, the sound image moves to the left of the user when the user turns his/her head to the right, and the sound image moves to the right of the user when the user turns his/her head to the left. As seen from the above, in response to the motion of the user, the localized position of the sound image in the virtual space is needed to move in the direction opposite to the motion of the user. Such a process is performed by applying a 3D sound filter to the original sound information.

In view of the above, the present disclosure employs a 3D sound filter for causing a user to perceive a sound as a sound coming from a predetermined direction in a three-dimensional sound field, and performs a more appropriate calculation process for improving the audibility of a sound having a little change in the time domain. The object of the present disclosure is to provide an information processing method or the like that uses the appropriate calculation process to cause a user to perceive 3D sounds.

More specifically, the information processing method according to one aspect of the present disclosure is an information processing method of generating an output sound signal from sound information including information regarding a predetermined sound and information regarding a predetermined direction at each of time points in a time domain. The output sound signal is a signal for causing a user to perceive the predetermined sound in time series as a sound coming from an incoming direction in a three-dimensional sound field corresponding to the predetermined direction. The information processing method includes: calculating an angular amount of change in the predetermined direction in the time domain; selecting, based on the information regarding the predetermined direction, a three-dimensional (3D) sound filter for causing an inputted sound to be perceived as a sound coming from the incoming direction from among 3D sound filter candidates each prepared for a different incoming direction; and generating the output sound signal by inputting the information regarding the predetermined sound to the 3D sound filter selected, in which, when the angular amount of change calculated is less than a threshold, the selecting a 3D sound filter includes determining the 3D sound filter such that the predetermined sound is more strongly emphasized than when the angular amount of change calculated is greater than or equal to the threshold to cause the user to perceive the predetermined sound.

According to such an information processing method, when the calculated angular amount of change in the predetermined direction is less than the threshold, i.e., when a slightly changing predetermined sound whose incoming direction is difficult to be perceived by the user is included, the predetermined sound can be more strongly emphasized to be perceived by the user. The user's attention is given to the predetermined sound, and thus it is possible to more appropriately cause the user to perceive the slight change in the incoming direction of the predetermined sound.

Moreover, for example, in the determining the 3D sound filter, the 3D sound filter may be determined such that an angular amount of change in the incoming direction of the output sound signal to be generated using the 3D sound filter determined is greater than an angular amount of change in the incoming direction of the output sound signal to be generated using another 3D sound filter selected when the angular amount of change calculated is greater than or equal to the threshold.

In this manner, in order to more strongly emphasize the predetermined sound than the case where the 3D sound filter to be selected when the angular amount of change in the predetermined sound is greater than or equal to the threshold, i.e., the 3D sound filter for generating the output sound signal to have the angular amount of change preset in the content is applied, the 3D sound filter can be determined to increase the angular amount of change. As the result, the output sound signal has the expanded angular amount of change, and thus the predetermined sound is emphasized to be perceived.

Moreover, for example, in the determining the 3D sound filter, the 3D sound filter may be determined such that the angular amount of change in the incoming direction of the output sound signal to be generated using the 3D sound filter determined is increased with a decrease in the angular amount of change calculated.

In this manner, in order to more strongly emphasize the predetermined sound than the case where the 3D sound filter to be selected when the angular amount of change for the predetermined sound is greater than or equal to the threshold, i.e., the 3D sound filter for generating the output sound signal to have the angular amount of change preset in the content is applied, the 3D sound filter can be determined to increase the angular amount of change. As the result, the output sound signal has the expanded angular amount of change, and thus the predetermined sound is emphasized to be perceived. In doing so, the angular amount of change in sound of the output sound signal is increased with a decrease in angular amount of change included in the sound information. Accordingly, the predetermined sound whose change is difficult to be perceived due to its smallness in the original content is emphasized to be more audibly perceived, and the emphasized predetermined sound is presented to the user.

Moreover, for example, when the 3D sound filter determined is used, the angular amount of change in the incoming direction in the time domain of the output sound signal is expanded by being multiplied by an expansion coefficient denoted by $\alpha$, where $\alpha>1$, that increases with a decrease in the angular amount of change in the predetermined direction included in the sound information, and a relationship between the angular amount of change in the predetermined direction and the expansion coefficient may be non-linear.

In this manner, the angular amount of change in sound of the output sound signal is increased with a decrease in angular amount of change included in the sound information. Accordingly, the predetermined sound whose change is difficult to be perceived due to its smallness in the original content is emphasized to be more audibly perceived, and the emphasized predetermined sound is presented to the user. The angular amount is multiplied by expansion coefficient $\alpha$, and thus the relationship between the angular amount of change in the predetermined direction and the incoming direction of the predetermined sound in the output sound information becomes non-linear. Accordingly, it is possible to more notably increase the emphasis effect for a smaller change in the predetermined sound.

Moreover, for example, in the determining the 3D sound filter, the 3D sound filter may be determined such that the angular amount of change in the incoming direction in the time domain when the 3D sound filter determined is used and when the predetermined direction is in a rear side behind a boundary surface is greater than the angular amount of change in the incoming direction in the time domain when the 3D sound filter determined is used and when the predetermined direction is in a front side in front of the boundary surface. The boundary surface is a virtual boundary surface separating a head of the user into a front portion and a rear portion.

In this manner, in the rear side behind the boundary surface in which a change in the incoming direction is difficult to be perceived, it is possible to more significantly increase the emphasis effect than the front side in front of the boundary surface.

Moreover, for example, in the determining the 3D sound filter, the 3D sound filter may be determined such that the incoming direction of the output sound signal to be generated using the 3D sound filter determined oscillates in the time domain in comparison with the predetermined direction included in the sound information.

In this manner, the predetermined sound having the oscillating incoming direction in the output sound information can be presented to the user. The incoming direction oscillates in the time domain, and thus the predetermined sound is more audibly perceived by the user than the other sounds. Accordingly, there is an effect of causing the user to more clearly perceive the change in this predetermined sound.

Moreover, for example, when the 3D sound filter determined is used, the incoming direction at an N-th time point, where N is an integer of 2 or more, in the time domain of the output sound signal may be calculated by: multiplying a difference in the predetermined direction included in the sound information between a (N−1)-th time point in the time domain of the output sound signal and the N-th time point, by a numerical value at a corresponding time point in an oscillating function in which the numerical value oscillates in the time domain; and adding the difference multiplied to the predetermined direction included in the sound information at the (N−1)-th time point.

In this manner, the predetermined sound having the oscillating incoming direction in the output sound information can be presented to the user. The incoming direction oscillates in the time domain, and thus the predetermined sound is more audibly perceived by the user than the other sounds. Accordingly, there is an effect of causing the user to more clearly perceive the change in this predetermined sound.

Moreover, for example, in the determining the 3D sound filter, the 3D sound filter may be determined such that an amount of change in a sound pressure of the predetermined sound in the time domain of the output sound signal to be generated using the 3D sound filter determined is greater than an amount of change in the sound pressure of the predetermined sound of the output sound signal to be generated using another 3D sound filter selected when the angular amount of change calculated is greater than or equal to the threshold.

In this manner, in order to more strongly emphasize the predetermined sound than the case where the 3D sound filter to be selected when the angular amount of change for the predetermined sound is greater than or equal to the threshold, i.e., the 3D sound filter for generating the output sound signal to have the angular amount of change preset in the content is applied, the 3D sound filter can be determined to increase the amount of change in the sound pressure. As the result, the output sound signal has the expanded amount of change in the sound pressure, and thus the predetermined sound is emphasized to be perceived.

Moreover, for example, the information processing method according to one aspect of the present disclosure is an information processing method of generating an output sound signal from sound information including information regarding a predetermined sound and information regarding a predetermined direction at each of time points in a time domain. The output sound signal is a signal for causing a user to perceive the predetermined sound in time series as a sound coming from an incoming direction in a three-dimensional sound field corresponding to the predetermined direction. The information processing method may include: calculating an angular amount of change in the predetermined direction in the time domain; when the angular amount of change calculated is less than a threshold, correcting the information regarding the predetermined direction such that the predetermined sound is more strongly emphasized than when the angular amount of change calculated is greater than or equal to the threshold to cause the user to perceive the predetermined sound; and generating the output sound signal by inputting the information regarding the predetermined sound to a 3D sound filter selected based on the corrected information regarding the predetermined direction from among 3D sound filter candidates each prepared for a different incoming direction.

In this manner, when the calculated angular amount of change in the predetermined direction is less than the threshold, i.e., when the slightly changing predetermined sound whose incoming direction is difficult to be perceived by the user is included, the predetermined sound can be more strongly emphasized to be perceived by the user. For this purpose, the information regarding the predetermined direction included in the sound information is corrected, and thus the 3D sound filter to be selected can be changed to the 3D sound filter for more strongly emphasizing the predetermined sound to cause the user to perceive the predetermined sound. As the result, the user's attention is given to the predetermined sound, and thus it is possible to more appropriately cause the user to perceive the slight change in the incoming direction of the predetermined sound.

Moreover, a recording medium according to one aspect of the present disclosure is a non-transitory computer-readable recording medium having a program recorded thereon for causing a computer to execute the above-mentioned information processing method.

With this, using a computer, it is possible to produce the same effects as the above-mentioned information processing method.

Moreover, the sound reproduction device according to one aspect of the present disclosure is a sound reproduction device that generates and reproduces an output sound signal from sound information including information regarding a predetermined sound and information regarding a predetermined direction at each of time points in a time domain. The output sound signal is a signal for causing a user to perceive the predetermined sound as a sound coming from an incoming direction in a three-dimensional sound field corresponding to the predetermined direction. The sound reproduction device includes: an obtainer that obtains the sound information; a filter selector that calculates an angular amount of change in the predetermined direction in the time domain, and selects, based on the information regarding the predetermined direction, a three-dimensional (3D) sound filter for causing an inputted sound to be perceived as a sound coming from the incoming direction from among 3D sound filter candidates each prepared for a different incoming direction; an output sound generator that generates the output sound signal by inputting, as the inputted sound, the information regarding the predetermined sound to the 3D sound filter selected; and an outputter that outputs a sound according to the output sound signal generated, in which, when the angular amount of change calculated is less than a threshold, the filter selector determines the 3D sound filter such that the predetermined sound is more strongly emphasized than when the angular amount of change calculated is greater than or equal to the threshold to cause the user to perceive the predetermined sound.

With this, it is possible to produce the same effects as the above-mentioned information processing method.

Furthermore, these general and specific aspects may be implemented using a system, a device, a method, an integrated circuit, a computer program, or a non-transitory computer-readable medium such as a CD-ROM, or any combination of systems, devices, methods, integrated circuits, computer programs, or computer-readable media.

Hereinafter, an embodiment is specifically described with reference to the drawings. Note that the embodiment described here indicates one general or specific example of the present disclosure. The numerical values, shapes, materials, constituent elements, the arrangement and connection of the constituent elements, steps, the order of the steps, etc., indicated in the following embodiments are mere examples, and therefore do not limit the scope of the claims. In addition, among the structural components in the embodiment, components not recited in the independent claim are described as arbitrary structural components. Note that each of the drawings is a schematic diagram, and thus is not always illustrated precisely. Throughout the drawings, substantially the same elements are assigned with the same numerical references, and overlapping descriptions are omitted or simplified.

In addition, in the descriptions below, ordinal numbers such as first, second, and third may be assigned to elements. These ordinal numbers are assigned to the elements for the purpose of identifying the elements, and do not necessarily correspond to meaningful orders. These ordinal numbers may be switched as necessary, one or more ordinal numbers may be newly assigned, or some of the ordinal numbers may be removed.

Embodiment (Outline)

First, the outline of a sound reproduction device according to an embodiment is described. FIG. 1 is a schematic view illustrating an example of use of the sound reproduction device according to the embodiment. FIG. 1 shows user 99 who is using sound reproduction device 100.

Sound reproduction device 100 shown in FIG. 1 is used simultaneously with 3D image reproduction device 200. Viewing a 3D image and listening to a 3D sound are performed simultaneously, and thus the image and the sound mutually enhance the auditory presence and the visual presence, respectively. Accordingly, a user can feel as if he/she were in a location where the image and the sound have been recorded. For example, it is known that, in the case where an image (a video) of a person who is speaking is displayed, even when the localization of the sound image of the speech sound does not match with the mouth of the person, user 99 perceives a sound as the speech sound emitted from the mouth of the person. As seen from the above, the presence may be enhanced by combining the image and the sound, e.g., correcting the position of the sound image using the visual information.

3D image reproduction device 200 is an image display device worn on the head of user 99. Accordingly, 3D image reproduction device 200 moves integrally with the head of user 99. For example, as shown in FIG. 1, 3D image reproduction device 200 is a glasses-shaped device supported by the ears and nose of user 99.

3D image reproduction device 200 changes the displayed image according to the motion of the head of user 99, thereby allowing user 99 to feel as if user 99 turns his/her head in the three-dimensional image space. In other words, in the case where an object in the three-dimensional image space is located in front of user 99, the object moves to the left of user 99 when user 99 turns his/her head to the right, and the object moves to the right of user 99 when user 99 turns his/her head to the left. As described above, in response to the motion of user 99, 3D image reproduction device 200 moves the three-dimensional image space in the direction opposite to the motion of user 99.

3D image reproduction device 200 provides two images with a disparity respectively to the right and left eyes of user 99. User 99 can perceive the three-dimensional position of an object on the image based on the disparity between the provided images. Note that, when sound reproduction device 100 is used to reproduce a healing sound for inducing sleep, user 99 uses sound reproduction device 100 with his/her eyes closed, or the like, 3D image reproduction device 200 need not be used simultaneously. In other words, 3D image reproduction device 200 is not an essential component of the present disclosure.

Sound reproduction device 100 is a sound presentation device worn on the head of user 99. Accordingly, sound reproduction device 100 moves integrally with the head of user 99. For example, sound reproduction device 100 according to the present embodiment is a so-called over-ear headphone-shaped device. Note that the shape of sound reproduction device 100 is not limited to this. For example, a pair of two earplug-shaped devices independently worn on the right and left ears of user 99 is possible. The two devices communicate with each other, thereby presenting synchronized sounds of a sound for the right ear and a sound for the left ear.

Sound reproduction device 100 changes reproduction sound according to the motion of the head of user 99, thereby allowing user 99 to feel as if user 99 turns his/her head in the three-dimensional sound field. Accordingly, as described above, in response to the motion of user 99, sound reproduction device 100 moves the three-dimensional sound field in the direction opposite to the motion of the user.

Here, it is known that, when a change in the time domain regarding a sound image presented to a user becomes smaller, user 99 cannot clearly identify the motion of the sound image in the three-dimensional sound field. Sound reproduction device 100 according to the present embodiment corrects the reproduction sound by processing the sound information to compensate such a phenomenon, thereby allowing user 99 to perceive the motion of the sound image. In other words, sound reproduction device 100 obtains the amount of motion of the sound image, and more strongly emphasizes the predetermined sound in the three-dimensional sound field to cause user 99 to perceive the predetermined sound when the obtained amount of motion is less than the threshold.

The threshold is a numerical value related to the amount of motion which user 99 is unable to capture, and thus specific to user 99. Accordingly, an experimentally or empirically obtained value may be set as the threshold. Moreover, a threshold generalized according to statistics for multiple users 99 may be applied. Note that the amount of motion described here refers to an amount of change in the incoming direction of the predetermined sound during a short time period, more specifically, an amount of angle of change per short time period in the predetermined direction viewed from user 99. In other words, the amount of motion is expressed by a maximum value of the angle between the incoming directions of two predetermined sounds each corresponding to a different one of two time points during a period from the first time point to the second time point.

(Configuration)

Figure 2:
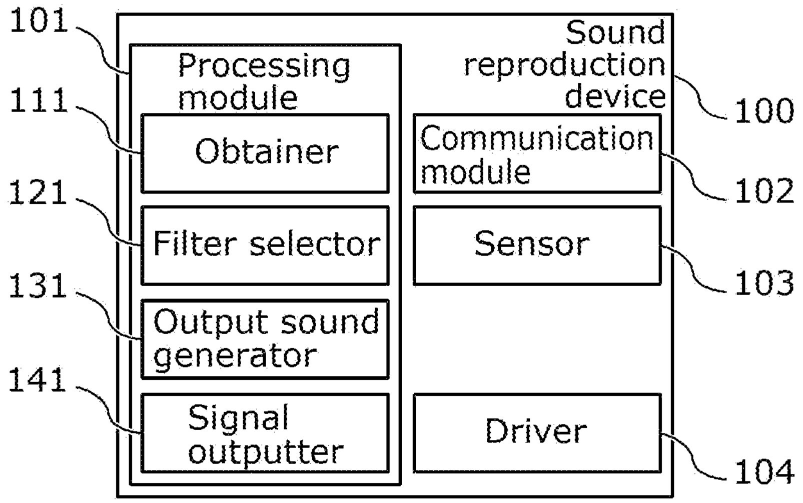
FIG. 2 is a block diagram illustrating the functional configuration of the sound reproduction device according the present embodiment.

Next, the configuration of sound reproduction device 100 according to the present embodiment is described with reference to FIG. 2. FIG. 2 is a block diagram illustrating the functional configuration of the sound reproduction device according the present embodiment.

As shown in FIG. 2, sound reproduction device 100 according to the present embodiment includes processing module 101, communication module 102, sensor 103, and driver 104.

Processing module 101 is a processing unit for performing various types of signal processing in sound reproduction device 100. For example, processing module 101 includes a processor and a memory, and fulfills various functions by causing the processor to execute a program stored in the memory. Processing module 101 includes obtainer 111, filter selector 121, output sound generator 131, and signal outputter 141. The details of each functional unit of processing module 101 are described later together with the details of components other than processing module 101.

Communication module 102 is an interface unit for receiving sound information to be inputted to sound reproduction device 100. For example, communication module 102 includes an antenna and a signal converter, and receives sound information from the external device via a wireless communication. More specifically, communication module 102 receives, using an antenna, a wireless signal indicating sound information transformed into a format for the wireless communication. In this manner, sound reproduction device 100 obtains sound information from an external device via a wireless communication. The sound information obtained through communication module 102 is obtained by obtainer 111. In this manner, sound information is inputted to processing module 101. Note that the communication between sound reproduction device 100 and the external device may be performed via a wired communication.

For example, the sound information obtained by sound reproduction device 100 is encoded in a predetermined format such as MPEG-H 3D Audio (ISO/IEC 23008-3). As one example, the encoded sound information includes: information regarding a predetermined sound to be reproduced by sound reproduction device 100; and information regarding a localized position when the sound image of the sound is localized at a predetermined position in a three-dimensional sound field (i.e., a user perceives the sound as a sound coming from a predetermined direction), i.e., information regarding a predetermined direction. For example, the sound information includes information regarding multiple sounds including a first predetermined sound and a second predetermined sound, and when each of the sounds is reproduced, each sound image is localized for a user to perceive the sound as a sound coming from a different direction in the three-dimensional sound field.

This 3D sound can enhance the presence of a listening content or the like, for example, together with an image watched using 3D image reproduction device 200. Note that the sound information may include only the information regarding a predetermined sound. In this case, the information regarding a predetermined direction may be obtained separately. As described above, the sound information includes the first sound information related to the first predetermined sound and the second sound information related to the second predetermined sound. However, each sound image may be localized at a different position in the three-dimensional sound field by obtaining and simultaneously reproducing multiple types of sound information each including a different one of the first sound information and the second sound information. The type of input sound information is not particularly limited, and it is sufficient that sound reproduction device 100 is provided with obtainer 111 that supports various types of sound information.

Figure 3:
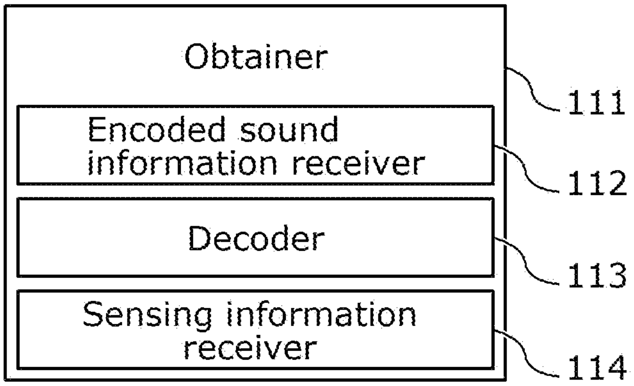
FIG. 3 is a block diagram illustrating the functional configuration of an obtainer according the present embodiment.

Here, one example of obtainer 111 is described with reference to FIG. 3. FIG. 3 is a block diagram illustrating the functional configuration of the obtainer according the present embodiment. As shown in FIG. 3, obtainer 111 according to the present embodiment includes, for example, encoded sound information receiver 112, decoder 113, and sensing information receiver 114.

Encoded sound information receiver 112 is a processing unit that receives encoded sound information obtained by obtainer 111. Encoded sound information receiver 112 provides the inputted sound information to decoder 113. Decoder 113 is a processing unit that generates the information regarding a predetermined sound included in the sound information and the information regarding a predetermined direction included in the sound information in a form used in the subsequent processes by decoding the sound information provided from encoded sound information receiver 112. Sensing information receiver 114 is described later together with the function of sensor 103.

Sensor 103 is a device for measuring a velocity of motion of the head of user 99. Sensor 103 is configured in combination of various sensors for use in motion detection such as a gyroscope sensor and an accelerometer. In the present embodiment, sensor 103 is included in sound reproduction device 100. However, for example, as with the case of sound reproduction device 100, sensor 103 may be included in the external device such as 3D image reproduction device 200 that operates in response to the motion of the head of user 99. In this case, sensor 103 need not be included in sound reproduction device 100. Alternatively, the motion of user 99 may be detected by using an external imaging device as sensor 103 to capture the motion of the head of user 99 and processing the captured image.

For example, sensor 103 is integrally attached to the housing of sound reproduction device 100, and measures a velocity of motion of the housing. Sound reproduction device 100 including the above housing moves integrally with the head of user 99 after being worn on user 99. Accordingly, this results in that sensor 103 can measure the velocity of motion of the head of user 99.

For example, as the amount of motion of the head of user 99, sensor 103 may measure the amount of rotation about at least one of three axes orthogonal to one another in the three-dimensional space, or the amount of displacement along at least one of the three axes. Alternatively, as the amount of motion of the head of user 99, sensor 103 may measure both the amount of rotation and the amount of displacement.

Sensing information receiver 114 obtains the velocity of motion of the head of user 99 from sensor 103. More specifically, sensing information receiver 114 obtains, as the velocity of motion, the amount of motion of the head of user 99 measured per unit time by sensor 103. In this manner, sensing information receiver 114 obtains at least one of a rotation rate or a displacement rate from sensor 103. The amount of motion of the head of user 99 obtained here is used to determine the coordinates and the orientation of user 99 in the three-dimensional sound field. In sound reproduction device 100, the relative position of the sound image is determined based on the determined coordinates and orientation of user 99, and the sound is reproduced. More specifically, the above function is implemented by filter selector 121 and output sound generator 131.

Filter selector 121 is a processing unit that determines from which direction in the three-dimensional sound field user 99 perceives a predetermined sound as a sound coming, based on the determined coordinates and orientation of user 99, and selects a 3D sound filter to be applied to the predetermined sound. The 3D sound filter is a function filter that causes user 99 to perceive an input predetermined sound as a sound coming from a predetermined direction based on a specific head-related transfer function, by convolving the predetermined sound with the specific head-related transfer function. In other words, a difference in sound pressure, a difference in time, a difference in phase, and the like are generated between the right sound signal and the left sound signal of a predetermined sound by inputting the predetermined sound (or information regarding the predetermined sound) into the 3D sound filter, and thus it is possible to output sound signals that achieves reproduction of the predetermined sound with the controlled incoming direction.

For example, 3D sound filter candidates for the selection are adjusted for each user 99 and prepared in advance.

Figure 4:
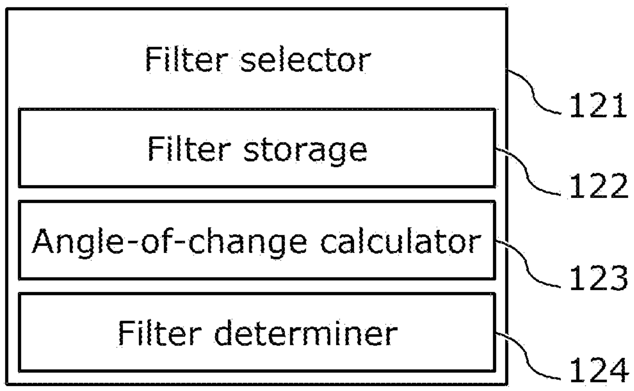
FIG. 4 is a block diagram illustrating the functional configuration of a filter selector according the present embodiment.

Here, one example of filter selector 121 is described with reference to FIG. 4. FIG. 4 is a block diagram illustrating the functional configuration of the filter selector according the present embodiment. As shown in FIG. 4, filter selector 121 according to the present embodiment includes, for example, filter storage 122, angle-of-change calculator 123, and filter determiner 124.

As described above, filter storage 122 is a storage device for storing 3D sound filter candidates each calculated and prepared in advance for a different incoming direction of a sound. Angle-of-change calculator 123 is a processing unit that calculates an amount of change in the predetermined direction (an angular amount) during a short time period based on the sound information. For example, angle-of-change calculator 123 calculates the amount of change in the predetermined direction during a fixed period within a range from several milliseconds to several seconds, from the information regarding the predetermined direction. Here, angle-of-change calculator 123 calculates, as the above-mentioned angular amount, a maximum angle of change in the predetermined direction during the above-mentioned period. Angle-of-change calculator 123 compares the calculated angular amount with the threshold. The result of the comparison, i.e., the calculated angular amount is less than the threshold, or the like, is used in filter determiner 124 to determine a 3D sound filter to be selected.

Filter determiner 124 is a processing unit that determines the 3D sound filter to be selected such that the predetermined sound is more strongly emphasized to cause user 99 to perceive the predetermined sound when the angular amount calculated by angle-of-change calculator 123 as described above is less than the threshold. The 3D sound filter determined by filter determiner 124 is outputted by reading out from filter storage 122, i.e., is outputted as the 3D sound filter selected by filter selector 121. The details of determination of the 3D sound filter by filter determiner 124 (i.e., selection of the 3D sound filter by filter selector 121) are described later.

Output sound generator 131 is a processing unit that generates an output sound signal using the 3D sound filter selected in filter selector 121 by inputting information regarding the predetermined sound included in the sound information to the selected 3D sound filter.

Figure 5:
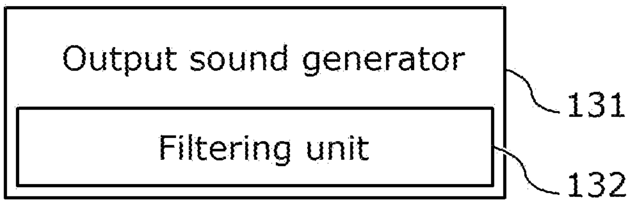
FIG. 5 is a block diagram illustrating the functional configuration of an output sound generator according the present embodiment.

Here, one example of output sound generator 131 is described with reference to FIG. 5. FIG. 5 is a block diagram illustrating the functional configuration of the output sound generator according the present embodiment. As shown in FIG. 5, output sound generator 131 according to the present embodiment includes, for example, filtering unit 132. Filtering unit 132 reads in the filters continuously selected by filter selector 121 in turn, and inputs the corresponding information regarding the predetermined sound in the time domain, thereby continuously outputting a sound signal for which the incoming direction of the predetermined sound is controlled in the three-dimensional sound field. In this manner, the sound information divided on a process unit time basis in the time domain is outputted as a serial sound signal (an output sound signal) in the time domain.

Signal outputter 141 is a functional unit that outputs the generated output sound signal to driver 104. Signal outputter 141 generates a waveform signal by converting from a digital signal to an analog signal based on the output sound signal or the like, causes driver 104 to generate a sound wave based on the waveform signal, and presents a sound to user 99. For example, driver 104 includes, for example, a diaphragm and a drive assembly such as a magnet and a voice coil. Driver 104 actuates the drive assembly according to the waveform signal, and the diaphragm is vibrated by the drive assembly. In this manner, driver 104 generates a sound wave by vibrating the diaphragm according to the output sound signal. The sound wave propagates through the air and reaches the ears of user 99, and user 99 perceives the sound.

(Operation)

Figure 6:
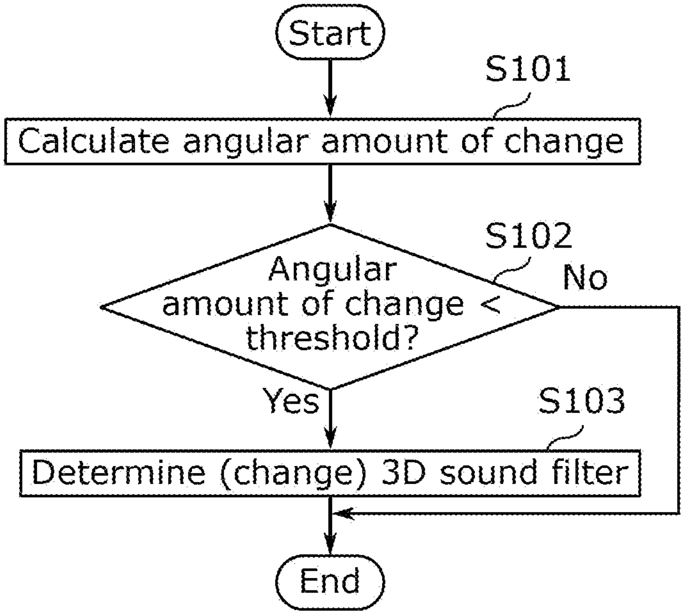
FIG. 6 is a flowchart illustrating an operation of the sound reproduction device according to the embodiment.

Next, the operation of above-mentioned sound reproduction device 100 is described with reference to FIG. 6. FIG. 6 is a flowchart illustrating an operation of the sound reproduction device according to the embodiment. First, after the operation of sound reproduction device 100 starts, obtainer 111 obtains sound information through communication module 102. The sound information is decoded into information regarding a predetermined sound and information regarding a predetermined direction by decoder 113, and selection of a filter starts.

In filter selector 121, a 3D sound filter for causing the predetermined sound to be reproduced to come from the incoming direction preset in the content (the incoming direction identical to the predetermined direction) is read out from filter storage 122 as a default filter. On the other hand, angle-of-change calculator 123 calculates the angular amount of change in the predetermined direction (S101). Subsequently, angle-of-change calculator 123 determines whether the angular amount of change is less than the threshold (S102). When the angular amount of change is greater than or equal to the threshold (No in S102), filter selector 121 terminates the processing, and outputs the 3D sound filter having the incoming direction matching the predetermined direction to output sound generator 131.

In contrast, when the angular amount of change is less than the threshold (Yes in S102), determination of the 3D sound filter by filter determiner 124 (S103) is performed. The determination of the 3D sound filter also can be read as selection to change the 3D sound filter selected as the default filter. Here, the incoming direction of the sound of the output sound signal is different from the predetermined direction in the sound information.

Note that, instead of setting the default 3D sound filter as described above, the 3D sound filter directly determined by filter determiner 124 may be read out from filter storage 122. In other words, the wording "change the 3D sound filter" is an expression used for descriptive purposes, and the present disclosure includes directly selecting and outputting the 3D sound filter without using the default 3D sound filter.

Figure 7:
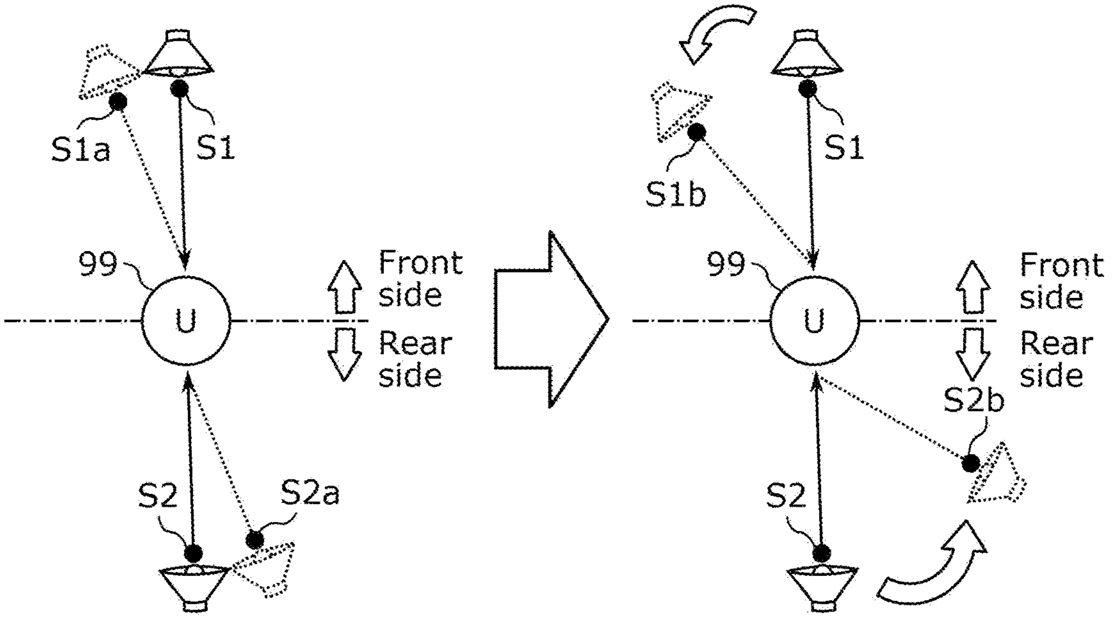
FIG. 7 is the first diagram illustrating the incoming direction of the predetermined sound through the selected 3D sound filter according to the present embodiment.
Figure 8:
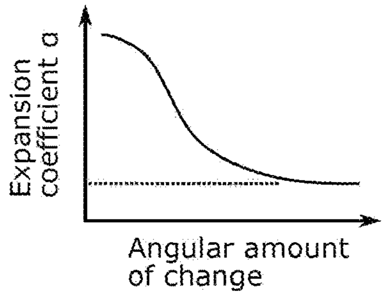
FIG. 8 is the second diagram illustrating the incoming direction of the predetermined sound through the selected 3D sound filter according to the present embodiment.
Figure 9:
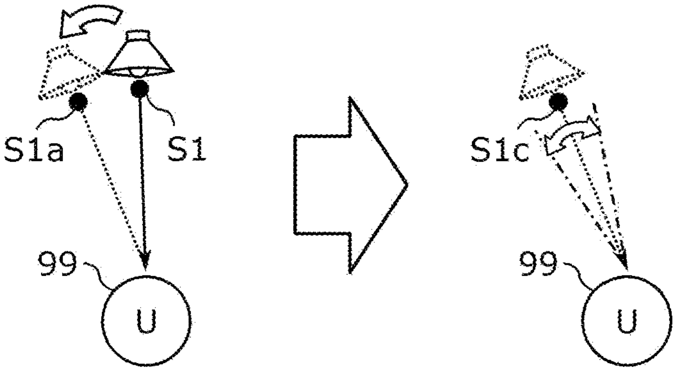
FIG. 9 is the third diagram illustrating the incoming direction of the predetermined sound through the selected 3D sound filter according to the present embodiment.

The following describes the determination of the 3D sound filter with reference to FIG. 7 through FIG. 9. FIG. 7 is the first diagram illustrating the incoming direction of the predetermined sound through the selected 3D sound filter according to the present embodiment. FIG. 8 is the second diagram illustrating the incoming direction of the predetermined sound through the selected 3D sound filter according to the present embodiment. FIG. 9 is the third diagram illustrating the incoming direction of the predetermined sound through the selected 3D sound filter according to the present embodiment.

FIG. 7 shows, in the left of the open right-pointing arrow, the incoming direction of the predetermined sound when the 3D sound filter is not changed. The incoming direction of the predetermined sound at the first time point is denoted by the solid line, and the incoming direction of the predetermined sound at the second time point subsequent to the first time point is denoted by the dotted line. FIG. 7 also shows, in the right of the open right-pointing arrow, the incoming direction of the predetermined sound when the 3D sound filter is changed. The incoming direction of the predetermined sound at the first time point is denoted by the solid line, and the incoming direction of the predetermined sound at the second time point subsequent to the first time point is denoted by the dotted line. In FIG. 7, user 99 who faces the upper direction of the paper is schematically shown by the circle marked with "U", and user 99 stands upright in the direction perpendicular to the paper.

Furthermore, in FIG. 7, the localized position of the predetermined sound is shown as the black circle, and the virtual speaker is shown together.

As shown in FIG. 7, the localized position of the first predetermined sound at the first time point is located at first position S1. When the 3D sound filter is not changed, the localized position of the first predetermined sound is shifted to second position S1*a* at the second time point. The predetermined direction is turned from the first direction connecting first position S1 and user 99 to the second direction connecting second position S1*a* and user 99. Note that it is assumed that the localized position of the first predetermined sound is linearly shifted between the first time point and the second time point in both the time domain and the spatial domain. When the amount of the turn from the first direction to the second direction (the amount of change in the incoming direction of the predetermined sound) is less than the threshold, user 99 is difficult to perceive the shift of the localized position of the first predetermined sound.

On the other hand, the localized position of the first predetermined sound is shifted to third position S1*b* at the second time point by changing the 3D sound filter. The predetermined direction is turned from the first direction connecting first position S1 and user 99 to the third direction connecting third position S1*b* and user 99. The difference between the second direction and the third direction (an angle enlarged by the change) may be, for example, a fixed angle such as 5 degrees, 10 degrees, 15 degrees, or 20 degrees, or the difference between the first direction and the third direction may sufficiently exceed the human's minimum distinguishable angle (approximately 10 degrees) based on the difference between the first direction and the second direction.

Moreover, the difference between the second direction and the third direction may be increased with a decrease in the difference between the first direction and the second direction (i.e., the angular amount of change in the predetermined direction included in the original sound information). More specifically, filter determiner 124 may determine the 3D sound filter such that the angular amount of change in the incoming direction of the output sound signal when the changed 3D sound filter is used is increased with a decrease in the angular amount of change in the predetermined direction included in the original sound information. For example, as shown in FIG. 8, the third direction is determined by multiplying the difference between the first direction and the second direction by expansion coefficient $\alpha$ ($\alpha>1$) that increases with a decrease in the angular amount of change in the predetermined direction included in the sound information, and the 3D sound filter may be changed such that the predetermined sound at the second time point comes from the third direction. In addition, expansion coefficient $\alpha$ may have a non-linear relationship to expand the angular amount that varies depending on a change as the angular amount of the change decreases.

Moreover, in FIG. 7, the dash-dot-dash line extending from left to right through user 99 shows a virtual boundary surface separating the head of user 99 into the front and rear portions. The boundary surface may be a surface defined along the ear canal of user 99, a surface passing through the backmost points of the pinnae of user 99, or simply a surface passing through the center of gravity of the head of user 99. It is known that there is a difference in the audibility of a sound between in front of and behind such a boundary surface, i.e., between in front of and behind user 99. Accordingly, it is effective to differentiate the change characteristics of the 3D sound filter between the front side and the rear side separated by the boundary surface.

In FIG. 7, the localized position of the second predetermined sound at the first time point is located at fourth position S2. When the 3D sound filter is not changed, the localized position of the second predetermined sound is shifted to fifth position S2*a* at the second time point. The predetermined direction is turned from the fourth direction connecting fourth position S2 and user 99 to the fifth direction connecting fifth position S2*a* and user 99. The first direction and the fourth direction are parallel, and the second direction and the fifth direction are parallel. Accordingly, during a period from the first time point to the second tame point, the angular amount of change in the second predetermined sound is equal to the angular amount of change in the first predetermined sound. However, the second predetermined sound is in the rear side behind the boundary surface (behind user 99), and thus a change in the second predetermined sound is difficult to be perceived by user 99 in comparison with the front side.

Accordingly, filter determiner 124 determines the 3D sound filter such that the angular amount of change in the incoming direction in the time domain in the case where the changed 3D sound filter is used when the predetermined direction is in the rear side behind the boundary surface is greater than the angular amount of change in the incoming direction in the time domain in the case where the changed 3D sound filter is used when the predetermined direction is in the front side in front of the boundary surface. For example, in FIG. 7, the localized position of the predetermined sound is changed from fourth position S2 of the fourth direction to sixth position S2*b* such that the angular amount of change is greater than the angle between the first direction and the third direction. The difference between the fifth direction and the sixth direction may be, for example, a fixed angle such as 10 degrees, 15 degrees, 20 degrees, or 25 degrees, or may be set to a multiple of the difference in the front side, such as 2 times, 3 times, 4 times, or 5 times.

Moreover, another example of the determination of the 3D sound filter by filter determiner 124 is shown in FIG. 9. FIG. 9 shows a drawing with the same structure as FIG. 7 except the structure after the change of the 3D sound filter (the right of the open right-pointing arrow). Note that FIG. 9 shows only the sound images in front of the boundary surface, and in the right of the open right-pointing arrow, first position S1 which is the localized position of the first predetermined sound at the first time point is not shown for the sake of the readableness.

As shown in FIG. 9, the first predetermined sound at the second time point is localized at seventh position S1*c*, and the 3D sound filter may be selected such that the incoming direction oscillates in a different manner from a change in the predetermined direction included in the sound information. FIG. 9 shows that the incoming direction of the first predetermined sound oscillates within the angle region that centrally covers seventh position S1*c* between two dash-dot-dash lines. As described, the first predetermined sound may be emphasized in a different manner from the expansion of the amount of change in the incoming direction. In the example of FIG. 9, user's 99 attention is paid to the first predetermined sound by causing the first predetermined sound to change periodically and regularly, and thus the first predetermined sound can be audibly perceived by user 99 paying attention even when the change is somewhat small.

Note that such a periodic and regular change can be generated by multiplying or adding the angular amount of change in the incoming direction of the predetermined sound, by or to an oscillating function in which the numerical value oscillates in the time domain such as the sine function or the cosine function. For example, when the changed 3D sound filter is used, the incoming direction at the N-th time point (N is an integer of 2 or more) in the time domain of the output sound signal (corresponding to the changed angular amount) may be calculated by multiplying a difference in the predetermined direction included in the sound information between the (N−1)-th time point in the time domain of the output sound signal and the N-th time point (corresponding to the original angular amount) by the numerical value at the corresponding time point in the oscillating function and adding the resultant difference to the predetermined direction included in the sound information at the (N−1)-th time point.

Alternatively, in order to emphasize the incoming direction of the predetermined sound at the second time point, the 3D sound filter may be changed such that the amount of change in sound pressure of the predetermined sound in the time domain of the output sound signal when the changed 3D sound filter is used is greater than that of when the original 3D sound filter is used. Moreover, the examples of changing the 3D sound filter do not contradict each other, and thus may be used in combination.

In this manner, in the present embodiment, the output sound signal can be generated such that a change in the incoming direction of the predetermined sound is emphasized by changing the 3D sound filter when the change is difficult to be perceived by user 99 due to the amount of the change less than the threshold. Accordingly, a small change in the incoming direction of the predetermined sound, which is difficult to be perceived by user 99, is more clarified, and thus it is possible to cause user 99 to more appropriately perceive 3D sounds.

Other Embodiments

Although a preferred embodiment has been described above, the present invention is not limited to the foregoing embodiment.

For example, in the foregoing embodiment, an example in which a sound does not follow the motion of the head of a user has been described, but the present disclosure is also effective in the case where a sound follows the motion of the head of a user. In other words, in the operation for causing a user to perceive the predetermined sound as a sound coming from the first position that relatively moves together with the motion of the head of the user, the 3D sound filter may be selected to emphasize a change in the incoming direction of the predetermined sound when the amount of the change is less than the threshold.

Moreover, for example, the sound reproduction device described in the foregoing embodiment may be implemented as a single device including all the components, or by assigning each function to a different device and cooperating with each other. In the latter case, an information processing device such as a smart phone, a tablet terminal, or a PC may be used as a device corresponding to a processing module.

As a configuration different from that in the description of the foregoing embodiment, for example, it is also possible to correct the original sound information in the decoder and thereby select the changed 3D sound filter. More specifically, the decoder according to the present example is a processing unit that corrects the original sound information as well as generates information regarding the predetermined direction included in the sound information. The decoder calculates an angular amount of change in the predetermined direction in the time domain. When the angular amount of change calculated is less than a threshold, the decoder corrects the information regarding the predetermined direction such that the predetermined sound is more strongly emphasized than when the angular amount of change calculated is greater than or equal to the threshold to cause the user to perceive the predetermined sound. In this manner, the changed 3D sound filter according to the foregoing embodiment is applied only by selecting a 3D sound filter for defining the incoming direction of the predetermined sound based on the corrected information regarding the predetermined direction outputted from the decoder.

As described above, the information processing method or the like according to the present disclosure may be implemented by correcting the information regarding the predetermined direction in the original sound information. For example, a sound reproduction device that produces the same effects as the present disclosure can be implemented simply by replacing the decoder of the conventional 3D sound reproduction device with the decoder as described above.

Moreover, the sound reproduction device according to the present disclosure can be implemented as a sound reproduction device that is connected to a reproduction device including only a driver and only outputs an output sound signal to the reproduction device using the 3D sound filter selected based on the obtained sound information. In this case, the sound reproduction device may be implemented as a hardware provided with a dedicated circuit, or as a software for causing a general-purpose processor to execute a specific process.

Moreover, in the foregoing embodiment, the process performed by a specific processing unit may be performed by another processing unit. Moreover, the order of the processes may be changed, or the processes may be performed in parallel.

Moreover, in the foregoing embodiment, each structural component may be realized by executing a software program suitable for each structural component. Each structural component may be realized by reading out and executing a software program recorded on a recording medium, such as a hard disk or a semiconductor memory, by a program executer, such as a CPU or a processor.

Furthermore, each structural component may be realized by hardware. For example, each structural component may be a circuit (or an integrated circuit). The circuits may constitute a single circuit as a whole, or may be individual circuits. Furthermore, each of the circuits may be a general-purpose circuit or a dedicated circuit.

Furthermore, an overall or specific aspect of the present disclosure may be implemented using a system, a device, a method, an integrated circuit, a computer program, or a computer-readable recording medium such as a CD-ROM. Furthermore, the overall or specific aspect of the present disclosure may also be implemented using any combination of systems, devices, methods, integrated circuits, computer programs, or recording media.

For example, the present disclosure may be implemented as a sound signal reproduction method executed by a computer, or may be implemented as a program for causing a computer to execute the sound signal reproduction method. The present disclosure may be implemented as a computer-readable non-transitory recording medium that stores such a program.

The present disclosure includes, for example, embodiments that can be obtained by various modifications to the respective embodiments and variations that may be conceived by those skilled in the art, and embodiments obtained by combining structural components and functions in the respective embodiments in any manner without departing from the essence of the present disclosure.

INDUSTRIAL APPLICABILITY

The present disclosure is useful in reproducing a sound, such as causing a user to perceive a 3D sound.

The invention claimed is:

1. An information processing method comprising:

obtaining sound information including a sound signal regarding a predetermined sound and information regarding a predetermined position, and sensor information indicating coordinates and orientation of a user in a three-dimensional sound field, at each of time points in a time domain, calculating a first incoming direction based on a first predetermined position at a first time point and coordinates and orientation of a listener at the first time point, using the sound information and the sensor information, calculating a second incoming direction based on a second predetermined position at a second time point and coordinates and orientation of the listener at the second time point, using the sound information and the sensor information, determining whether a first angular difference indicating a difference in angle between the first incoming direction and the second incoming direction is less than a threshold, and when the first angular difference is less than the threshold, determining a third incoming direction by correcting the second incoming direction, and generating an output sound signal by convolving the sound signal with a head-related transfer function corresponding to the third incoming direction;

wherein in the determining of the third incoming direction, the second incoming direction is corrected such that a second angular difference indicating a difference in angle between the first incoming direction and the third incoming direction is greater than the first angular difference.

2. The information processing method according to claim 1, wherein in the determining of the third incoming direction, the third incoming direction is determined such that the second angular difference is expanded by being multiplied by an expansion coefficient denoted by $\alpha$, where $\alpha>1$, that increases with a decrease in the first angular difference, and a relationship between the first angular difference and the expansion coefficient is non-linear.

3. The information processing method according to claim 1, wherein in the determining of the third incoming direction, the third incoming direction is determined such that the second angular difference when the first predetermined position is in a rear side behind a boundary surface is greater than the second angular difference when the first predetermined position is in a front side in front of the boundary surface, the boundary surface being a virtual boundary surface separating a head of the user into a front portion and a rear portion.

4. The information processing method according to claim 1, wherein in the determining of the third incoming direction, the third incoming direction is determined such that the third incoming direction of the output sound signal oscillates in the time domain in comparison with the first incoming direction.

5. The information processing method according to claim 4, wherein when the sound signal is convolved with the head-related transfer function corresponding to the third incoming direction, an incoming direction at an N-th time point, where Nis an integer of 2 or more, in the time domain of the output sound signal is calculated by:

multiplying a difference in the incoming direction between a (N−1)-th time point in the time domain of the output sound signal and the N-th time point, by a numerical value at a corresponding time point in an oscillating function in which the numerical value oscillates in the time domain; and adding the difference multiplied to the incoming direction at the (N−1)-th time point.

6. The information processing method according to claim 1, wherein in the generating of the output sound signal, the output sound signal is generated such that an amount of change in a sound pressure of the predetermined sound in the time domain of the output sound signal to be generated by convolving the sound signal with the head-related transfer function corresponding to the third incoming direction is greater than an amount of change in the sound pressure of the predetermined sound of the output sound signal to be generated when the first angular difference is greater than or equal to the threshold.

7. A non-transitory computer-readable recording medium for use in a computer, the recording medium having a program recorded thereon for causing the computer to execute the information processing method according to claim 1.

8. A sound reproduction device comprising:

a memory; and a processor configured to execute instructions stored on the memory to cause the sound reproduction device to:

obtain sound information including a sound signal regarding a predetermined sound and information regarding a predetermined position, and sensor information indicating coordinates and orientation of a user in a three-dimensional sound field, at each of time points in a time domain, calculate a first incoming direction based on a first predetermined position at a first time point and coordinates and orientation of a listener at the first time point, using the sound information and the sensor information, calculate a second incoming direction based on a second predetermined position at a second time point and coordinates and orientation of the listener at the second time point, using the sound information and the sensor information, determine whether a first angular difference indicating a difference in angle between the first incoming direction and the second incoming direction is less than a threshold, and when the first angular difference is less than the threshold, determine a third incoming direction by correcting the second incoming direction, and generate an output sound signal by convolving the sound signal with a head-related transfer function corresponding to the third incoming direction;

wherein in the determining of the third incoming direction, the second incoming direction is corrected such that a second angular difference indicating a difference in angle between the first incoming direction and the third incoming direction is greater than the first angular difference.

* * * * *